United States Patent
Zhou

(10) Patent No.: US 12,366,321 B2
(45) Date of Patent: Jul. 22, 2025

(54) MAGNET-BASED QUICK RELEASE ASSEMBLY AND GIMBAL SYSTEM

(71) Applicant: SZ DJI TECHNOLOGY CO., LTD., Shenzhen (CN)

(72) Inventor: Shiqiang Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 48 days.

(21) Appl. No.: 18/113,110

(22) Filed: Feb. 23, 2023

(65) Prior Publication Data
US 2023/0204152 A1    Jun. 29, 2023

Related U.S. Application Data

(63) Continuation of application No. PCT/CN2020/111432, filed on Aug. 26, 2020.

(30) Foreign Application Priority Data

Aug. 25, 2020   (WO) ............... PCT/CN2020/111162

(51) Int. Cl.
*F16M 11/20*     (2006.01)
*F16M 11/04*     (2006.01)

(52) U.S. Cl.
CPC ......... *F16M 11/205* (2013.01); *F16M 11/041* (2013.01)

(58) Field of Classification Search
CPC .... F16M 11/041; F16M 11/10; F16M 11/105; F16M 11/121; F16M 11/123;
(Continued)

(56) References Cited

U.S. PATENT DOCUMENTS 7,621,492 B2   11/2009  Omps
9,458,963 B1 * 10/2016  Choi ...................... F16M 11/10
(Continued)

FOREIGN PATENT DOCUMENTS

CN    105759905 A    7/2016
CN    205545473 U    8/2016
(Continued)

OTHER PUBLICATIONS

International Search Report and Written Opinion mailed on May 14, 2021, received for PCT Application PCT/CN2020/111162, filed on Aug. 25, 2020, 11 pages including English Translation.
(Continued)

*Primary Examiner* — Eret C McNichols
(74) *Attorney, Agent, or Firm* — ANOVA LAW GROUP, PLLC

(57) ABSTRACT

A quick release assembly and gimbal system are disclosed. The gimbal system includes a handheld gimbal and an apparatus for mounting an electronic structure on the handheld gimbal. The handheld gimbal includes a handheld structure, a gimbal body operably coupled with the handheld structure, and a connector assembly operably coupled with the gimbal body. The connector assembly includes a first set of attraction structures. The apparatus includes a mounting structure attachable to the electronic structure. The mounting structure includes a second set attraction structures. The first set of attraction structures are configured to attach to the second set of magnets, the first set of attraction structures and the second set of attraction structures configured to cause at least one of the connector assembly or the mounting structure to rotate in a direction such that the mounting structure is coupled to the connector assembly.

20 Claims, 11 Drawing Sheets

(58) Field of Classification Search
CPC .. F16M 11/18; F16M 11/205; F16M 11/2064; F16M 11/242; F16M 11/28
See application file for complete search history.

(56) References Cited

U.S. PATENT DOCUMENTS

| | | | |
|---|---|---|---|
| 10,506,334 B1* | 12/2019 | Shukla | F16M 11/123 |
| 10,536,630 B2* | 1/2020 | Enke | F16M 11/12 |
| 10,655,776 B2* | 5/2020 | Huang | H02K 11/215 |
| 10,914,418 B2* | 2/2021 | Wang | F16M 11/041 |
| 2014/0355200 A1 | 12/2014 | Thiers | |
| 2015/0366336 A1 | 12/2015 | Wong | |
| 2016/0091924 A1 | 3/2016 | Aoki et al. | |
| 2016/0125988 A1 | 5/2016 | Lee | |
| 2022/0221102 A1* | 7/2022 | Yang | G03B 17/561 |
| 2024/0103566 A1* | 3/2024 | Lim | G06F 1/1601 |
| 2024/0209983 A1* | 6/2024 | Lv | F16M 13/04 |

FOREIGN PATENT DOCUMENTS

| | | |
|---|---|---|
| CN | 205716312 U | 11/2016 |
| CN | 205824534 U | 12/2016 |
| CN | 205945890 U | 2/2017 |
| CN | 206402077 U | 8/2017 |
| CN | 208703455 U | 4/2019 |
| CN | 208719789 U | 4/2019 |
| CN | 210128227 U | 3/2020 |
| CN | 210179194 A | 3/2020 |
| CN | 210196884 U | 3/2020 |
| CN | 210199412 U | 3/2020 |
| CN | 111384750 A | 7/2020 |

OTHER PUBLICATIONS

First Office Action mailed on Jul. 17, 2022, received for CN Application 202080007140.5, 33 pages including English Translation.

Notice of Reasons for Refusal mailed on Feb. 1, 2022, received for JP Application 2021-011499, 14 pages including English Translation.

Notice of Reasons for Refusal mailed on May 10, 2022, received for JP Application 2021-011499, 8 pages including English Translation.

International Search Report and Written Opinion mailed on May 25, 2021, received for PCT Application PCT/CN2020/111432, filed on Aug. 26, 2020, 11 pages.

* cited by examiner

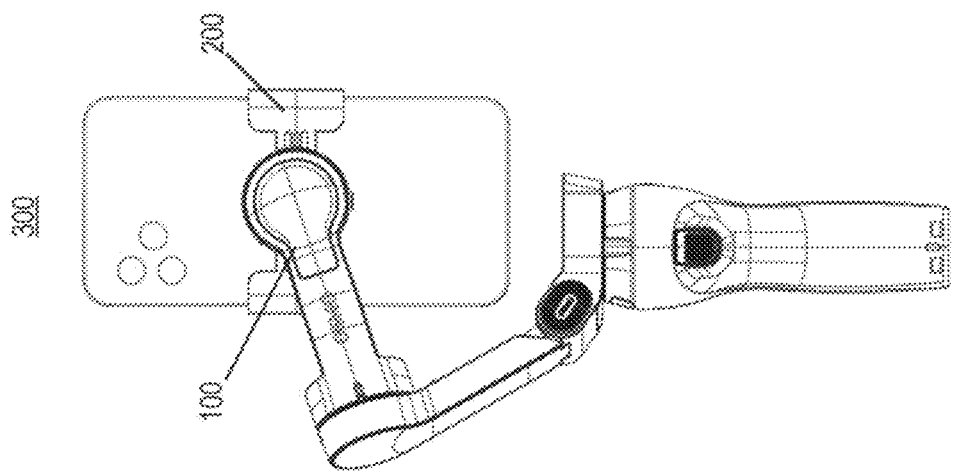
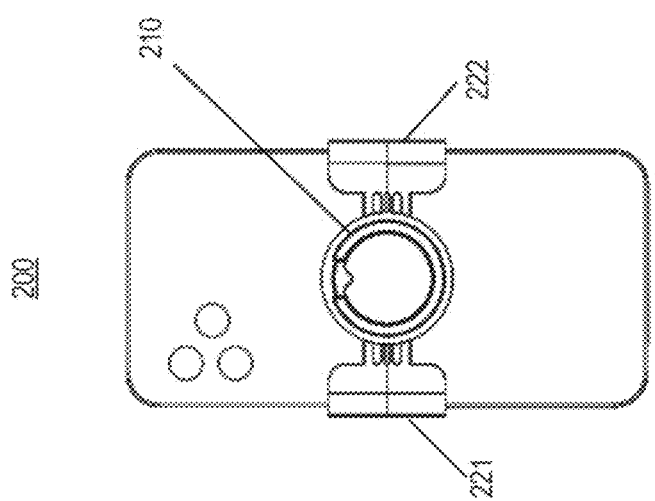
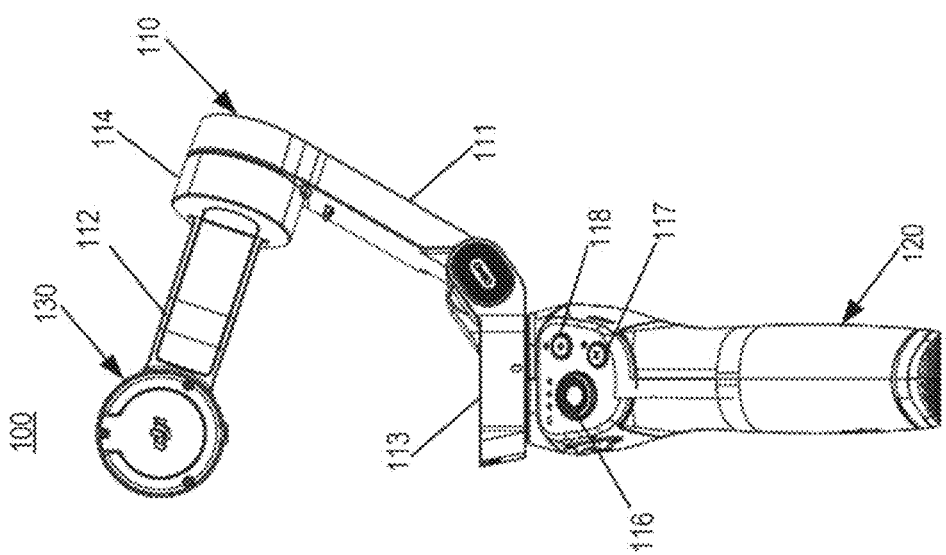

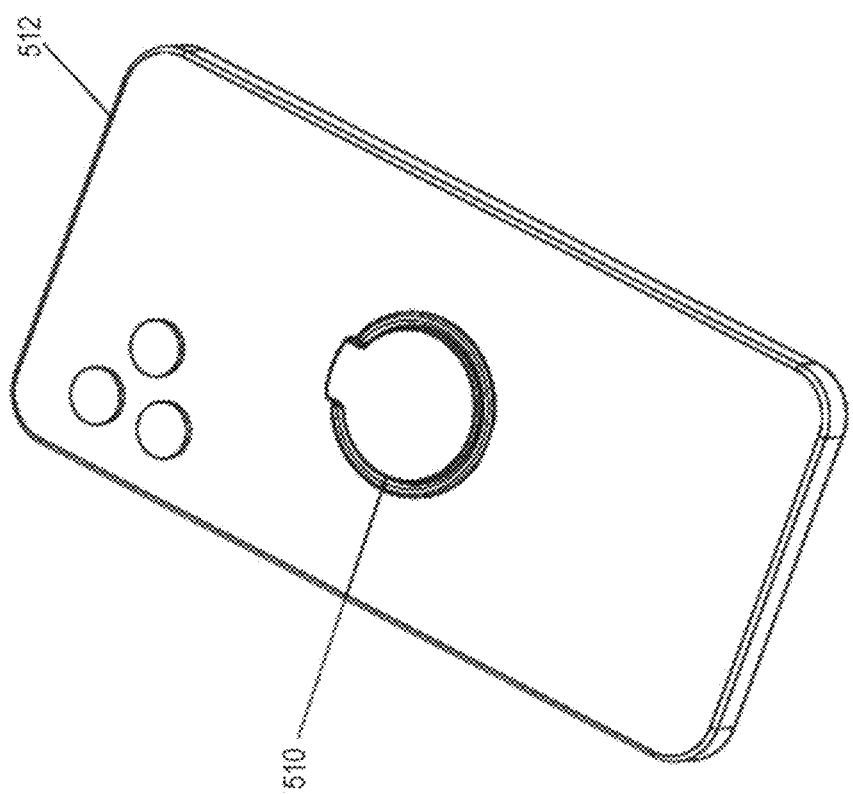

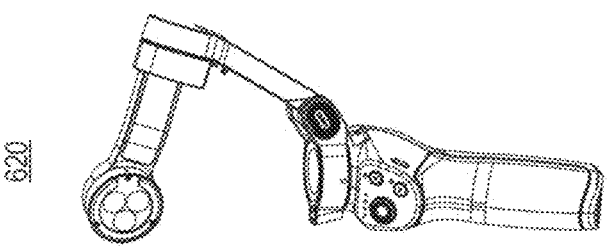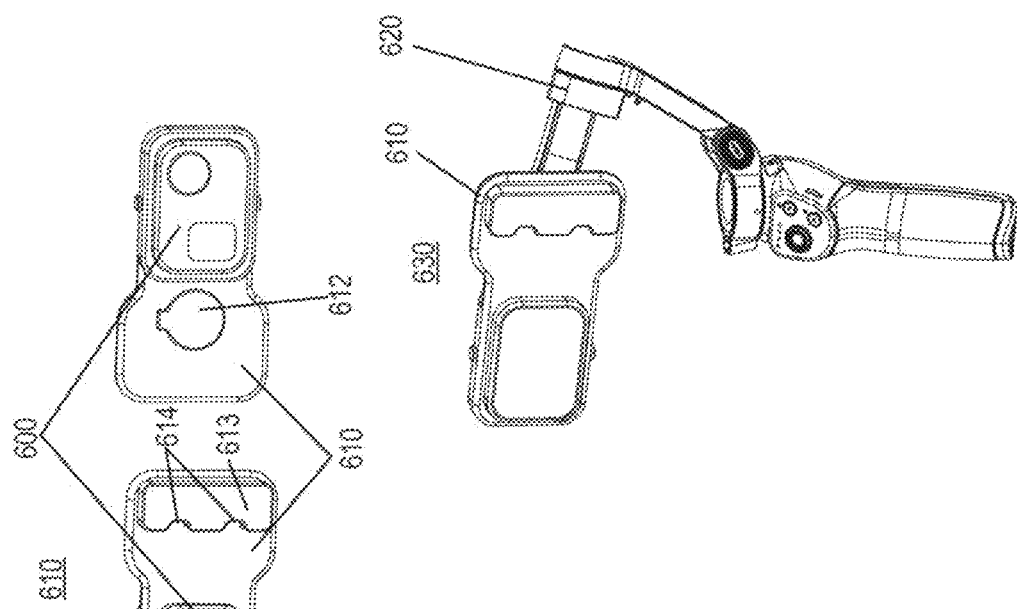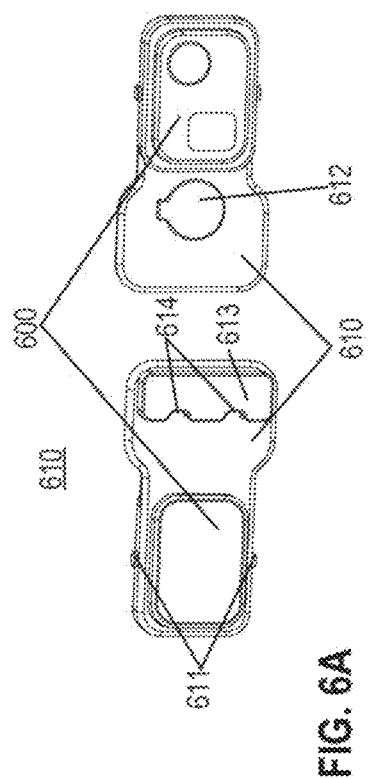

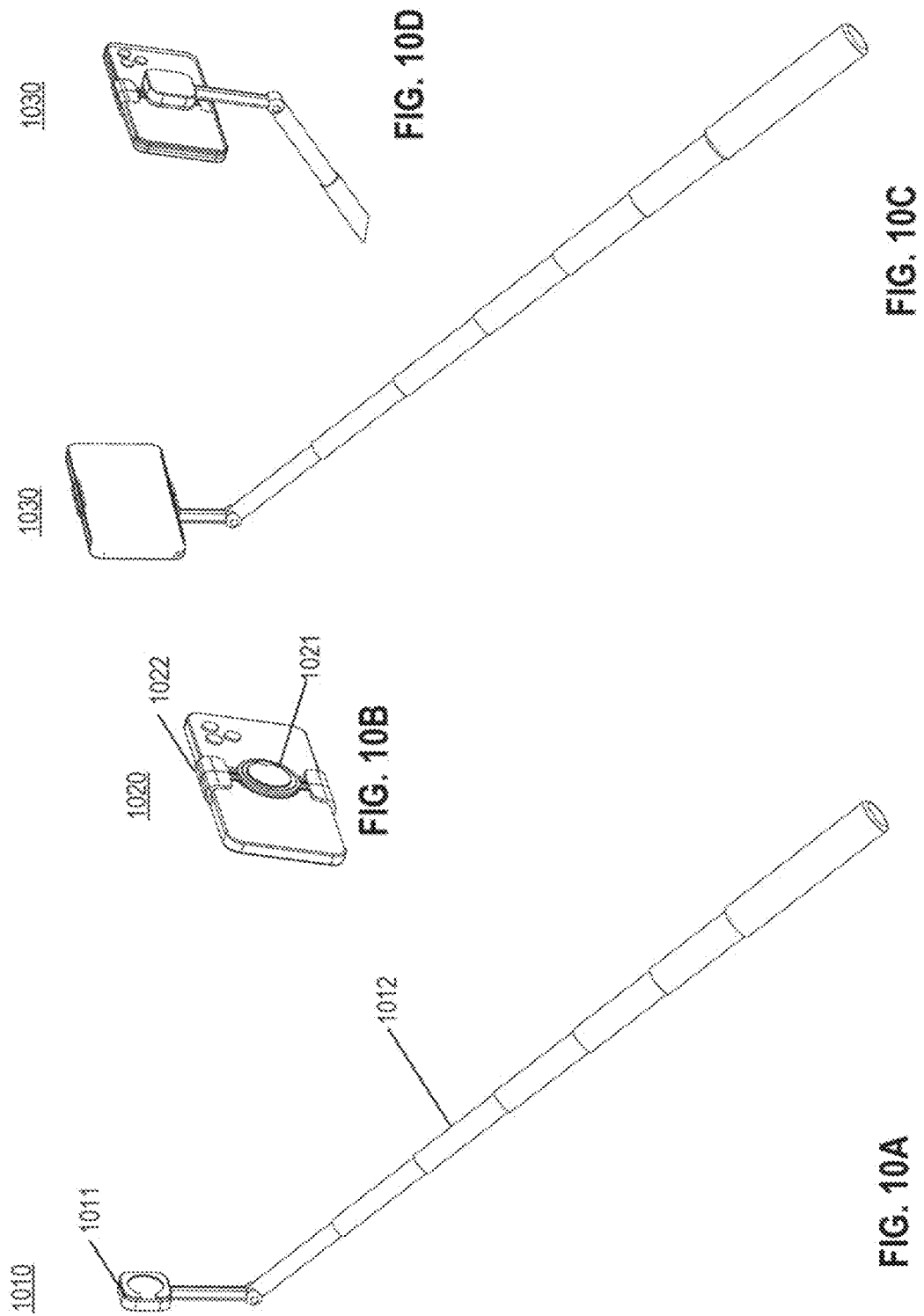

MAGNET-BASED QUICK RELEASE ASSEMBLY AND GIMBAL SYSTEM

CROSS-REFERENCE TO RELATED APPLICATIONS

The present application is a continuation of International Application No. PCT/CN2020/111432, filed Aug. 26, 2020, which claims priority to PCT/CN2020/111162, filed Aug. 25, 2020, the entire contents of each are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to a handheld gimbal and, more particularly, to a quick release connector assembly and gimbal system.

BACKGROUND

Handheld gimbals can be used with various portable imaging devices, such as mobile phones, to capture stable images in a motion state. A mobile phone clip may be installed on the handheld gimbal to hold the phone in place. Usually the mobile phone clip is not removable from the handheld gimbal. When the mobile phone is mounted on the handheld gimbal, the mobile phone needs to be adjusted back and forth so that the center of gravity of the gimbal fall on a corresponding axis. For example, the center of gravity of the parts of the gimbal connected to the yaw motor should fall on a yaw axis, and the center of gravity of the parts of the gimbal connected to the roll motor should fall on a roll axis. Thus, each time the user mounts the mobile phone on the handheld gimbal, the user is required to adjust the position of the phone to make sure the center of gravity of the gimbal fall on a corresponding axis.

SUMMARY

In one disclosed embodiment, a handheld gimbal is disclosed. The handheld gimbal includes a handheld structure, a gimbal body operably coupled with the handheld structure, and a connector assembly operably coupled with the gimbal body. The connector assembly includes one or more attraction members or structures for detachably mounting an electronic device or structure on the gimbal body. The one or more attraction members are configured to cause at least one of the connector assembly or a mounting structure attached to the electronic device to rotate in a direction such that the connector assembly is coupled to the mounting structure.

In another disclosed embodiment, an apparatus for mounting a load on a handheld gimbal is disclosed. The apparatus includes a mounting structure attachable to the load. The mounting structure includes one or more attraction members for detachably mounting the load on the handheld gimbal. The one or more attraction members are configured to cause at least one of a connector assembly on the handheld gimbal or the mounting structure to rotate in a direction such that the mounting structure is coupled to the connector assembly.

In another disclosed embodiment, a gimbal system is disclosed. The gimbal system includes a handheld gimbal and an apparatus for detachably mounting an electronic device on the handheld gimbal. The handheld gimbal includes a handheld structure, a gimbal body operably coupled with the handheld structure, and a connector assembly operably coupled with the gimbal body. The connector assembly includes a first set of attraction members for detachably mounting an electronic device on the gimbal body. The apparatus includes a mounting structure attachable to the electronic device. The mounting structure includes a second set of attraction members for detachably mounting the electronic device on the handheld gimbal. The first set of attraction members are configured to attach to the second set of attraction members, the first set of attraction members and the second set of attraction members configured to cause at least one of the connector assembly or the mounting structure to rotate in a direction such that the mounting structure is coupled to the connector assembly.

In another disclosed embodiment, a quick release assembly is disclosed. The quick release assembly includes a connector assembly operably coupled with a first apparatus, a rotating mechanism operably coupled with the connector assembly, the rotating mechanism configured to cause the connector assembly to rotate, and a mounting structure attachable to a second apparatus. The connector assembly includes a first set of attraction members, and the mounting structure includes a second set attraction members for detachably mounting the second apparatus on the first apparatus. The first set of magnets are configured to attach to the second set of attraction members, the first set of magnets and the second set of attraction members configured to cause the connector assembly to rotate in a direction such that the connector assembly is coupled to the mounting structure.

In another disclosed embodiment, a quick release assembly is disclosed. The quick release assembly includes a connector assembly operably coupled with a first apparatus and a mounting structure attachable to a second apparatus. The connector assembly includes a first set of attraction members, and the mounting structure includes a second set attraction members for detachably mounting the second apparatus on the first apparatus. The first set of magnets are configured to attach to the second set of such that the connector assembly is coupled to the mounting structure.

It is to be understood that both the foregoing general description and the following detailed description are exemplary and explanatory only and are not restrictive of the invention, as claimed. Other features and advantages of the present invention will become apparent by a review of the specification, claims, and appended figures.

BRIEF DESCRIPTION OF THE DRAWINGS

FIGS. 1A-1C are schematic diagrams showing an exemplary quick release assembly for a handheld gimbal, in accordance with embodiments of the present disclosure.

FIG. 5 is a schematic diagram showing an exemplary mounting structure for a mobile phone, in accordance with embodiments of the present disclosure.

FIG. 6A is a schematic diagram showing an exemplary camera adapter, in accordance with embodiments of the present disclosure.

FIG. 6B is a schematic diagram showing an exemplary handheld gimbal, in accordance with some embodiments of the present disclosure.

FIG. 6C is a schematic diagram showing an exemplary gimbal system, in accordance with embodiments of the present disclosure.

FIGS. 10A-10D are schematic diagrams showing an exemplary quick release assembly for an extension rod, in accordance with embodiments of the present disclosure.

DETAILED DESCRIPTION

Figure 2:
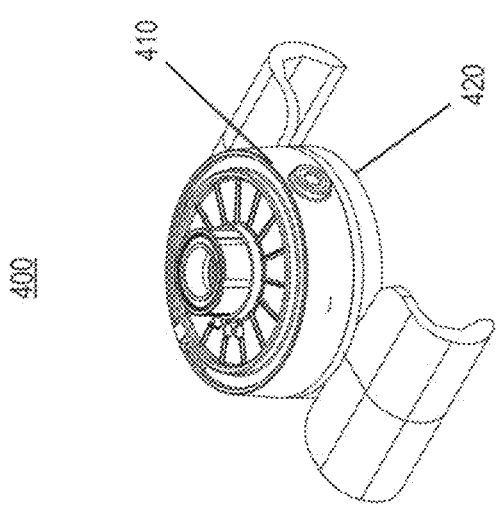
FIG. 2 is a schematic diagram showing an exemplary quick release assembly, in accordance with embodiments of the present disclosure.

The following detailed description refers to the accompanying drawings. Wherever possible, the same reference numbers refer to the same or similar parts. While several illustrative embodiments are described herein, modifications, adaptations, and other implementations are possible. For example, substitutions, additions, or modifications may be made to the components illustrated in the drawings. Accordingly, the following detailed description is not limited to the disclosed embodiments and examples. Instead, the proper scope is defined by the appended claims.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "vertical," "left," "right," "up," "upward," "upwardly," "down," "downward," "downwardly," and similar expressions used herein are merely intended for describing relative positional relationship.

A handheld gimbal may hold a load (e.g., a mobile phone or a camera) to capture images or videos. The handheld gimbal may be configured to adjust the load position (e.g., changing a height, an angle, and/or an orientation of the load), and stabilize the load to maintain a certain position. For example, a mobile phone may be mounted on the handheld gimbal. After the mobile phone is mounted on the handheld gimbal, the camera of the mobile phone needs to be oriented in a specific direction relative to the gimbal, so that the camera will not be blocked by other structures. Generally speaking, when the gimbal is powered on, the camera of the mobile phone should be adjusted such that other structures of the gimbal, such as the gimbal frames, are not captured by the camera in the pictures. In addition, it is also necessary to adjust the mobile phone such that the center of gravity of the gimbal falls on an appropriate axis for the gimbal motors. It is therefore desired that the load holder is detachable from the handheld gimbal, allowing a user to maintain the connection between the load and the load holder when detaching the load from the gimbal and avoid repeatedly adjusting the position of the phone every time the phone is mounted to the handheld gimbal.

Consistent with embodiments of the present disclosure, a magnet-based quick release assembly and gimbal system are provided. A connector assembly is provided on the handheld gimbal to attach to a mounting structure that is attachable to a load (e.g., a mobile phone, or a camera). The connector assembly and mounting structure each includes one or more attraction members, such as magnets. The attraction members on the connector assembly are configured to attract the attraction members (e.g., magnets) on the mounting structure. The attraction members on the connector assembly and mounting structure may also cause the connector assembly and/or the mounting structure to rotate in a direction such that the connector assembly is coupled to the mounting structure. The embodiments described in the present disclosure allow the mounting structure holding the load to be detachable from the handheld gimbal and to quickly attach to handheld gimbal with minimal user operation. For example, the embodiments described in the present disclosure allow the load to be mounted on a preset position of the handheld gimbal in a preset direction.

In some embodiments, the handheld gimbal includes an inertial measurement unit (IMU) used to detect an attitude of the load. The IMU and the attraction members may be provided in a stator or a rotor of an electric motor. In some embodiments, the IMU may be provided in the mounting structure attached to the load for communication with the controller of the handheld gimbal via the communication between the connector assembly and mounting structure or wireless communication connection with the controller of the handheld gimbal.

In some embodiments, when the mounting structure is separated from the handheld gimbal, the handheld gimbal may enter into sleep mode, be powered off, or maintain a low output of the electric motor. When the mounting structure is reinstalled on the handheld gimbal, the attraction force between the attraction members on the connector assembly and mounting structure can be greater than the output of the motor connected to the attraction members on the connector assembly, so that the motor connected to the attraction members on the connector assembly can perform rotation to correct the installation position of the load connector and the handheld gimbal.

FIG. 1A is a schematic diagram showing an exemplary handheld gimbal 100, in accordance with embodiments of the present disclosure. The handheld gimbal 100 includes a gimbal body 110 and a handheld structure 120 operably coupled with the gimbal body 110. The gimbal body 110 is operably coupled with a connector assembly 130. A load (e.g., an electronic device) is detachably mounted on the gimbal body 110 via the connector assembly 130. The gimbal body 110 includes one or more frame components 111 and 112. The gimbal body 110 further include one or more electric motors 113 and 114 to drive the frame components to move on one or more axes, such as a pitch axis, a roll axis, and a yaw axis. For example, the electric motor 113 may drive the frame component 111 to rotate around the yaw axis, and the electric motor 114 may drive the frame component 112 to rotate around the pitch axis or the roll axis. The gimbal body 110 may include a number of frame components and electric motors different from FIG. 1A.

The electric motors 113 and 114 each may include one or more magnet sensors used for sensing a position or rotation of the frame components. For example, the electric motor 113 may include a magnet sensor to detect a position or rotation of the frame component 111, and the electric motor 114 may include another magnet sensor to detect a position or rotation of the frame component 112. In some embodiments, the magnet sensor may be a Hall effect sensor. A Hall effect sensor is a solid state magnetic sensor device and can be used for sensing position, velocity, and/or directional movement. The Hall effect sensors provide advantages including non-contact wear free operation, low maintenance, robust design, and low susceptibility to vibration, dust, and moisture as a result of their robust packaging.

The connector assembly 130 includes one or more attraction members for detachably mounting a load (e.g., an electronic device) on the gimbal body 110. For example, the attraction members can include magnets, iron, or a combination of both. The electronic device may be a mobile phone, a camera, a portable electronic device (e.g., a tablet), or the like. In some embodiments, the connector assembly 130 is operably coupled with one of the electric motors, such as the electric motor 114. The connector assembly 130 may be operably coupled with an electric motor. In some embodiments, the electric motor 114 coupled with the connector assembly 130 may be a roll motor. The connector assembly 130 may be driven by the roll motor to rotate when the load is mounted onto the handheld gimbal. The roll motor may include a stator and a rotor, and the connector assembly 130 may be operably connected to the rotor of the roll motor. The electric motor 114 may drive the connector assembly 130 to move or rotate in a certain direction. In some embodiments, the connector assembly 130 is connected to a rotating mechanism, such as the rotation axis of the gimbal. In some embodiments, the rotating mechanism may include a motor for switching between horizontal and vertical shooting, or a non-motor rotating mechanism for switching horizontal and vertical shooting.

In some embodiments, the gimbal body 110 may be rotatable relative to the handheld structure 120 to cause the handheld gimbal 110 to switch between a folded state and a use state. When the handheld gimbal 110 is in the folded state, the one or more attraction members may be located between the handheld structure 120 and the electric motor coupled with connector assembly 130.

As shown in FIG. 1A, the handheld structure 120 may include a joystick 116 to control the movement of the frame components, for example, rotating one of the frame components of the handheld gimbal 100 in a direction corresponding to the respective frame component by toggling the control joystick 116. The handheld structure 120 may also include a power/mode button 117 for powering on and off the handheld gimbal 100 and selecting an operation mode, such as a horizontal shooting mode or a vertical shooting mode. The handheld structure 120 may further include a shutter/record button 118 to start or stop recording, or to take a photo by the electronic device mounted on the handheld gimbal.

The handheld gimbal 100 shown in FIG. 1A is illustrative, and a handheld gimbal may include more or less components than the handheld gimbal 100 shown in FIG. 1A without departing from the spirit of the present disclosure. For example, the handheld gimbal may be a three-axis gimbal that include frame components and electric motors configured to drive the frame components to rotate around the yaw-axis, pitch-axis, and roll-axis. As another example, the gimbal body may include an inertial measurement unit (IMU) to determine the actual attitude of the electronic device. The gimbal body may also include operational buttons that can effect a zooming of the electronic device and electrical interfaces allowing charging of the handheld gimbal and the electronic device. The handheld structure may also include a display screen for displaying a status of the handheld gimbal or the mobile phone.

FIG. 1B is a schematic diagram showing an exemplary mobile phone holder 200, in accordance with embodiments of the present disclosure. The mobile phone holder 200 is also referred to as a mounting structure in the present disclosure. The mobile phone holder 200 is removably attachable to the mobile phone. The mobile phone holder 200 includes a center portion 210 that includes one or more attraction members (e.g., magnets, iron) configured to attach to the magnets in the connector assembly 130 of the handheld gimbal. The center portion 210 is shown as a circular shape in FIG. 1B, and the center portion 210 may be any other shape (e.g., rectangle, square, hexagon) with departing from the spirit of the present disclosure. The mobile phone holder 200 also includes clamping portions 221 and 222 for holding the mobile phone. The clamping portions 221 and 222 may be pulled outwards to place the mobile phone in the mobile phone holder 200 and may be released to hold the phone in place.

FIG. 1C is a schematic diagram showing an exemplary gimbal system 300, in accordance with embodiments of the present disclosure. The gimbal system 300 includes the handheld gimbal 100 and the mobile phone holder 200 mounted on the handheld gimbal. When the mounting structure 210 of the mobile phone holder 200 is near the connector assembly 130 of the handheld gimbal 100, the magnets on the connector assembly 130 may automatically guide the connector assembly to the correct position by magnet attraction. In addition, when a user holding the mounting structure 210 near the connector assembly 130, the magnets on the mounting structure 210 and connector assembly 130 may provide a guiding force to promote the correct attraction of the mounting structure 210 and connector assembly 130, and automatically correct the position and direction of mounting structure 210 and connector assembly 130, such that the connector assembly 130 is connected to the mounting structure 210 firmly. Through the magnetic connection, a quick release and attachment of the handheld gimbal 100 and mobile phone holder 200 are realized. The magnetic connection also facilitates connecting the handheld gimbal 100 and mobile phone holder 200 at a preset position that is suitable for the photo or video shooting.

FIG. 2 is a schematic diagram showing an exemplary quick release assembly 400, in accordance with embodiments of the present disclosure. The quick release assembly includes a connector assembly 410 and a mounting structure 420. The connector assembly 410 is operably coupled with a first apparatus, such as a handheld gimbal, and the mounting structure 420 is attachable to a second apparatus, such as an electronic device. In some embodiments, the mounting structure 420 is removably attachable to the second apparatus. The connector assembly 410 includes a first set of attraction members (e.g., magnets, iron), and the mounting structure 420 includes a second set of attraction members (e.g., magnets, iron). The first set of attraction members are configured to attach to the second set of attraction members by magnetic attraction such that the connector assembly 410 is coupled to the mounting structure 420. The connector assembly 410 can be detached from the mounting structure 420 by applying force to separate the first set of attraction members from the second set of attraction members. In some embodiments, the connector assembly 410 may be connected to an electric motor (e.g., a roll motor, a pitch motor, or the motor located near the connector assembly) that causes the connector assembly to rotate in a direction such that the first set of attraction members are positioned in a position to attract the second set of attraction members. In some embodiments, the connector assembly 410 may be operably coupled with a remote controller, a tripod head, or other devices, and the mounting structure 420 may be removably attachable to a load, so as to achieve a quick release connection between the device and the load. In some embodiments, the same connector assembly 410 may be attach to a variety of devices via the quick release connection, where the mounting structure 420 may be provided on each the variety of devices. In some embodiments, the same mounting structure 420 may be attach to a variety of devices via the quick release connection, where the connector assembly 410 may be provided on each the variety of devices.

In some embodiments, the first apparatus includes a remote controller, and the second apparatus includes a load. For example, the remote controller may include an electric motor to move the connector assembly 410 provided on the remote controller. As another example, the remote controller may not include an electric motor, and the attraction members may cause the mounting structure 420 provided on the load to rotate to couple to the connector assembly 410 on the remote controller at a preset position. In some embodiments, the first apparatus includes a tripod, and the second apparatus includes a handheld gimbal. For example, the tripod may include an electric motor to move the connector assembly 410 provided on the tripod. As another example, the tripod may not include an electric motor, and the attraction members may cause the mounting structure 420 provided on the handheld gimbal to rotate to couple to the connector assembly 410 on the tripod at a preset position. In some embodiments, the first apparatus includes a handheld gimbal, and the second apparatus includes a tripod. For example, the handheld gimbal may include an electric motor (e.g., a yaw motor or an electric motor located away from the load mounted on the handheld gimbal) to move the connector assembly 410 provided on the handheld gimbal. As another example, the attraction members may cause the mounting structure 420 provided on the tripod to rotate to couple to the connector assembly 410 on the handheld gimbal at a preset position. In some embodiments, the first apparatus includes a movable object, and the second device includes a load. The movable object may include a drone, an unmanned vehicle, an unmanned boat, a wearable device, etc., and the load includes a gimbal, an imaging device, ranging devices, microphones, and/or other electronic devices.

In some embodiments, the quick release assembly 400 includes a rotating mechanism. The rotating mechanism may be provided in the first apparatus, and the connector assembly 410 may be operably connected to the rotating mechanism. The rotating mechanism may be a motor-based rotating mechanism or a non-motor-based rotating mechanism. Through the design of the rotating mechanism, when the first apparatus is connected with the second apparatus, the attracting members on the connecting assembly and the mounting structure may cause the rotating mechanism to rotate relative to the body of the first apparatus, so that the mounting structure 420 and the connecting assembly 410 can be connected at a preset position (e.g., when the mounting structure 420 and the connecting assembly 410 need to have a unique connection position).

In some embodiments, the rotation of the rotating mechanism can also be achieved by means other than magnetic force. For example, when the first apparatus is connected to the apparatus device, the position of the mounting structure 420 relative to the rotating mechanism can be detected by a sensor, which may trigger the rotation of the rotating mechanism by transmitting a signal to the rotating mechanism.

In some embodiments, when the quick release assembly 400 includes a rotating mechanism, the connecting assembly 410 and the mounting structure 420 may not include attraction members, and they may be connected and locked by means of mechanical structures (e.g., clamping, pins, dovetail grooves, etc.). Thus, the connection alignment between the connecting assembly 410 and the mounting structure 420 may be achieved by mechanical connection and triggering signal.

In some embodiments, the quick release assembly 400 may not include a rotating mechanism, and the quick release connection between the first apparatus and the second apparatus may be realized by the magnetic attraction force between the attraction members. For example, the first apparatus may be a gimbal, which can be set on an airborne platform, a vehicle-mounted platform, or a handheld platform. The second apparatus may be a load, which is connected to the gimbal through the magnetic quick release connection between the gimbal and the load. The quick release connection between the gimbal and the load allows the load to switch between the airborne platform, vehicle platform or handheld platform.

In some embodiments, the quick release assembly 400 may not include a rotating mechanism, and the first apparatus may be connected to multiple second apparatuses through the magnetic quick release connection to achieve special effects. For example, the gimbal can be connected to multiple loads via magnetic quick release and the different loads may be cooperated to achieve corresponding effects, such as the imaging by visible light cameras and invisible light cameras, or the audio and video recording by the imaging device and microphone. The specific types of the first apparatus and the second apparatus are not limited to the above description and can include other types of devices known by a person of ordinary skill in the art.

The attraction members in the connector assembly 410 and mounting structure 420 can include one or more single-sided unipolar magnets and/or single-sided bipolar magnets. A magnet usually has two magnetic poles, one North pole and one South pole. The selected metal for the magnet may be a soft magnetic material. Generally, two magnets with different poles are attracted to each other. For single-sided unipolar magnetization, one side of the magnet is the North pole and the other side of the magnet is the South pole when the magnet is axially magnetized. The South pole and the North pole usually are located at opposite ends of the single-sided unipolar magnet. For single-sided bipolar magnetization, one magnet is divided into two poles on the same surface, such as concentric circles composed of inner and outer rings. After axial magnetization, on one side, the inner ring is North pole, the outer ring is South pole, and on the other side, the inner ring is South pole, and the outer ring is North pole.

A magnetic induction curve or flux lines of the magnet is transmitted from the N pole to the S pole. Because the path of the induction curve of the single-stage magnet is more open and the influence range is larger, the magnetic circuit of the single-sided bipolar magnet is more convergent than the single-sided unipolar magnet. Further, the attraction force of the single-sided bipolar magnet for attracted items (e.g., magnets, iron, steel, etc.) in the far range is smaller than the single-sided unipolar magnet, and the attraction force of the single-sided bipolar magnet for iron in the near range is greater than the single-sided unipolar magnet.

Figure 3B:
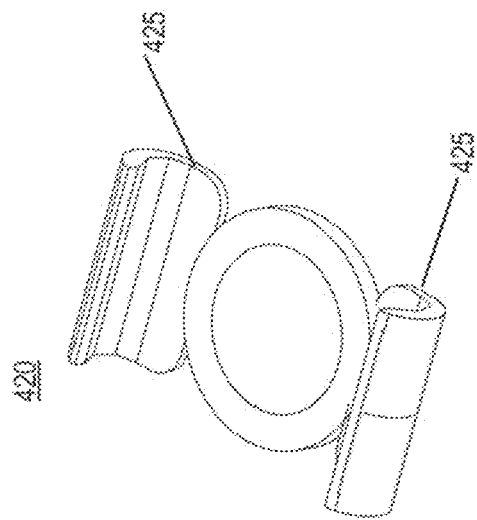
FIG. 3B is a schematic diagram showing a back view of an exemplary mounting structure, in accordance with embodiments of the present disclosure.
Figure 3C:
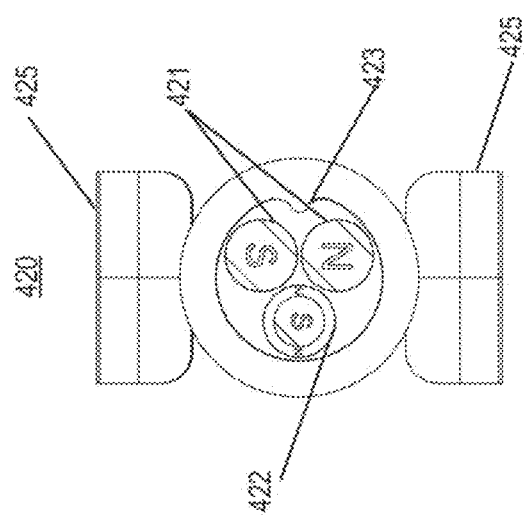
FIG. 3C is a schematic diagram showing a top view of an exemplary mounting structure, in accordance with embodiments of the present disclosure.
Figure 3A:
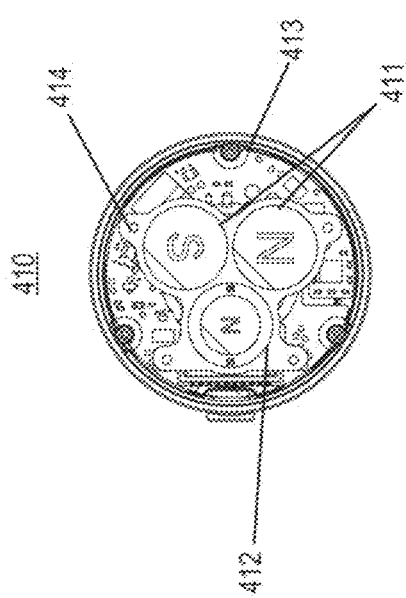
FIG. 3A is a schematic diagram showing an exemplary connector assembly, in accordance with embodiments of the present disclosure.

FIG. 3A is a schematic diagram showing the exemplary connector assembly 410 in greater detail, in accordance with embodiments of the present disclosure. The connector assembly 410 may be fixedly coupled to a device, such as a handheld gimbal. As shown in FIG. 3A, the connector assembly 410 may include two single-sided unipolar magnets 411, a single-sided bipolar magnet 412, a positioning structure 413, and a metal piece 414. Each of the single-sided unipolar magnets 411 includes a North pole and a South pole located at opposite ends of the single-sided unipolar magnet. The single-sided bipolar magnet 412 includes a North pole located at an inner ring of the single-sided bipolar magnet and a South pole located at an outer ring of the single-sided bipolar magnet. The inner ring and outer ring have the same size of area such that the attraction force generated by the South pole and North pole of the single-sided bipolar magnet is even. The positioning structure 413 is configured to fit with a corresponding structure on the mounting structure 420, such that the connector assembly 410 will not attach to the mounting structure 420 at an incorrect position. A metal piece 414 is coupled to the magnets 411 and 412 to reduce magnetic circuit leakage, thereby reducing the interference to the internal magnetic sensor (e.g., the Hall effect sensor) of the handheld gimbal. In some embodiments, the metal piece 414 may be a thin metal sheet.

As shown in FIG. 3A, the magnetic poles in the first single-sided unipolar magnet have opposite directions to magnetic poles in a second single-sided unipolar magnet. As shown in FIG. 3A, centers of the single-sided bipolar magnet 412 and the two single-sided unipolar magnets 411 may be triangularly distributed. In some embodiments, the connector assembly 410 further comprises a magnetic yoke member or structure (e.g., iron, steel, etc.) magnetized by the single-sided unipolar magnet 411, the magnetic yoke member and the single-sided unipolar magnet 411 attract one or more attraction members on the mounting structure 420.

In some embodiments, the connector assembly 410 may further include a friction member 430 or structure attached to the magnets 411 and 412. In other embodiments, the friction member 430 attached to the mounting structure 420. The friction member 430 may be located between the connector assembly 410 and the mounting structure 420. The friction member 430 can be used to increase the friction between the connector assembly 410 and the device the connector assembly 410 is coupled with, such as a handheld gimbal. With the increased friction, the friction member 430 prevents the connector assembly 410 from moving on the surface of the device, further stabilizes the load, and avoids shaking problems with the load. In some embodiments, the friction member 430 may include a silicone component, such as a silicone ring. In some embodiments, the friction member 430 may be placed surrounding the magnets 411 and 412. In other embodiments, the connector assembly 410 may include an inclined surface or elastic structures to facilitate stabilization of the load.

In some embodiments, the connector assembly 410 may include one or more single-sided unipolar magnets and not include any single-sided bipolar magnet. In other embodiments, the connector assembly 410 may include one or more single-sided bipolar magnets and not include any single-sided unipolar magnet. In other embodiments, such as the embodiment shown in FIG. 3A, the connector assembly 410 may include both single-sided unipolar magnets and a single-sided bipolar magnet. The arrangement of the South pole and North pole in the single-sided unipolar magnet and single-sided bipolar magnet can vary from the embodiment shown in FIG. 3A without departing from the scope of the present disclosure. For example, the inner ring of the single-sided bipolar magnet can be a South pole, and the outer ring of the single-sided bipolar magnet can be a North pole. As another example, the arrangement of the South pole and North pole in the single-sided unipolar magnets can be reversed. For example, magnetic poles in a first single-sided unipolar magnets have opposite directions to magnetic poles in a second single-sided unipolar magnets.

Figure 4A:
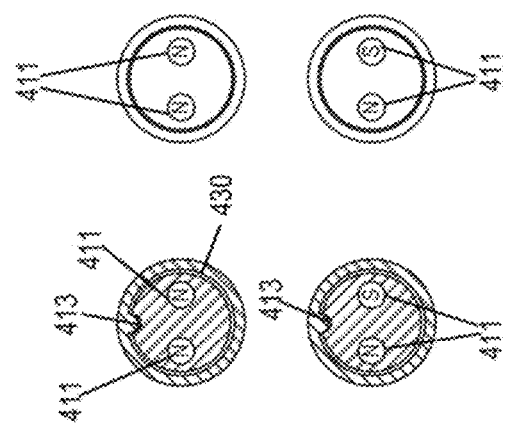
FIG. 4A-4E are schematic diagrams showing components of an exemplary connector assembly, in accordance with embodiments of the present disclosure.

In some embodiments, the connector assembly 410 may include one single-sided unipolar magnet and one or more magnetic yoke members magnetized by the one single-sided unipolar magnet. The single-sided unipolar magnet and magnetic yoke members may attract attraction members on the mounting structure 420. FIG. 4A shows a single-sided bipolar magnet 411 in the connector assembly 410, according to embodiments of the present disclosure. As shown in FIG. 4A, the connector assembly 410 further includes two magnetic yoke members 415 magnetize by the single-sided unipolar magnet 411. The single-sided unipolar magnet 411 and magnetic yoke members 415 may attract attraction members on the mounting structure 420.

Figure 4B:
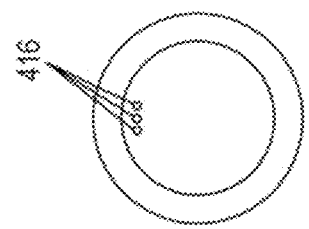

FIG. 4B shows various arrangements of two single-sided bipolar magnet in the connector assembly 410, according to embodiments of the present disclosure. As shown in the top left figure of FIG. 4B, the connector assembly 410 may include a positioning structure 413, and the magnetic poles in a first single-sided unipolar magnets may have the same directions to magnetic poles in a second single-sided unipolar magnets. In this example, the positioning structure 413 and the two single-sided bipolar magnet 411 with the same magnetic pole direction may operate to attract magnets in the mounting structure 420 at a preset position. As shown in the bottom left figure of FIG. 4B, the connector assembly 410 may include a positioning structure 413, and the magnetic poles in a first single-sided unipolar magnets may have the opposite directions to magnetic poles in a second single-sided unipolar magnets. In this example, the positioning structure 413 and the two single-sided bipolar magnet 411 with the opposite magnetic pole directions may operate to attract magnets in the mounting structure 420 at a preset position. As shown in the bottom right figure of FIG. 4B, the connector assembly 410 may not include a positioning structure 413, and the magnetic poles in a first single-sided unipolar magnets may have the opposite directions to magnetic poles in a second single-sided unipolar magnets. In this example, the two single-sided bipolar magnet 411 with the opposite magnetic pole directions may operate to attract magnets in the mounting structure 420 at a preset position. As shown in the top right figure of FIG. 4B, the connector assembly 410 may not include a positioning structure 413, and the magnetic poles in a first single-sided unipolar magnets may have the same directions to magnetic poles in a second single-sided unipolar magnets. In this example, the two single-sided bipolar magnet 411 with the same magnetic pole direction may attract magnets in the mounting structure 420 at a position different from the preset position. As such, the magnetic layout shown in the top right figure of FIG. 4B may not be the preferred layout compared to the other examples shown in FIG. 4B.

In some embodiments, the connector assembly 410 may include attraction members (e.g., magnets) at two or more positions such that attraction force is generated at the two or more positions for connecting the connector assembly 410 to the corresponding attraction members (e.g., magnets) on the mounting structure 420. The attraction force may also cause the connector assembly 410 to rotate at a certain direction to connect to the corresponding attraction members (e.g., magnets) on the mounting structure 420. In some embodiments, the attraction force may be generated by attraction members (e.g., magnets) at the three positions on the connector assembly 410, and the three positions may be triangularly distributed on a surface of the connector assembly 410. In some embodiments, when the connecting assembly includes three or more attracting members, the three or more attracting members can be arranged linearly, in a plane array, in a circular arrangement, or in an arbitrary shape.

In some embodiments, it may be advantageous to include a single-sided bipolar magnet in the connector assembly 410. Due to the magnetic circuit convergence properties of the single-sided bipolar magnet, the influence on the compass of the mobile phone can be reduced. Further, since the single-sided bipolar magnet has two poles in the same plane, its magnetic circuit self-convergence can improve the positioning force between the connector assembly 410 and mounting structure 420 in the near area and prevent misalignment.

Figure 4C:
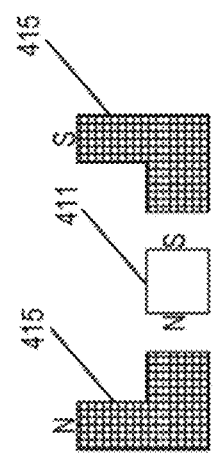

In some embodiments, the single-sided bipolar magnet may include a layout of the magnetic poles different from the inner ring and outer ring layout shown in FIG. 3A. For example, the single-sided bipolar magnet may have a south pole and a north pole located on a side of the single-sided bipolar magnet, where the south pole and north pole are located at opposite ends of the side. As shown in FIG. 4C, the single-sided bipolar magnet 412 may include a south pole and a north pole located at opposite ends of one side of the single-sided bipolar magnet.

In some embodiments, the magnets 411 and 412 may be placed above a magnetic sensor in a handheld gimbal. Because the converged magnetic circuit has less influence on the outside, the magnetic sensor, such as the Hall effect sensor, can be placed at the low-energy locations of the magnetic field to achieve full utilization of the gimbal space. In some embodiments, the magnetic sensor may be placed under the single-sided bipolar magnet 412, taking advantage of the magnetic circuit convergence properties of the single-sided bipolar magnet.

In some embodiments, the connector assembly 410 may include a positioning structure, such as the positioning structure 413, configured to fit with a corresponding positioning structure on the mounting structure 420. For example, the positioning structure may include a convex structure configured to couple with a concave structure of the mounting structure 420. As another example, the positioning structure may include an inclined surface configured to match an inclined surface on the mounting structure 420. As another example, the positioning structure may match a shape of the corresponding positioning structure on the mounting structure 420, and the shape of the positioning structure may be non-circular. The positioning structure on the connector assembly 410 facilitates alignment of the coupling between the connector assembly 410 and the mounting structure 420 at correct positions.

Figure 4D:
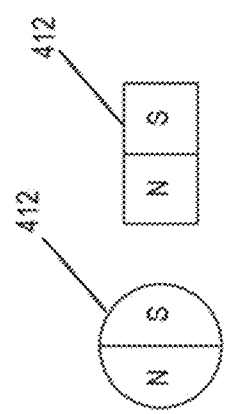

In some embodiments, the connector assembly 410 may include a first electrical interface configured to electrically connect to a second electrical interface in the mounting structure 420. As shown in FIG. 4D, the connector assembly 410 may include an electrical interface 416. In some embodiments, and the electrical interface 416 may be located near the edge of the connector assembly 410 such that there is sufficient space left on the connector assembly for placement the attraction members (e.g., magnets). The magnets 411 and 412 may be configured to cause at least one of the first electrical interface or second electrical interface to rotate in a direction such that the first electrical interface is coupled to the second electrical interface. The first electrical interface may be detachable from the second electrical interface. A battery power of the electronic device or the handheld gimbal may be charged via the first and second electrical interfaces. The electrical connection between the mounting structure 420 and the load is described later in connection with FIG. 3B.

In some embodiments, the connector assembly 410 may include a first communication interface configured to communicate with a second communication interface in the mounting structure 420. In some embodiments, and the first communication interface may be located near the edge of the connector assembly 410 such that there is sufficient space left on the connector assembly for placement the attraction members (e.g., magnets). The first communication interface may include a wired or wireless communication interface. The first communication interface may be detachable from the second communication interface. The first set of attraction members may be configured to cause at least one of the first communication interface or second communication interface to rotate in a direction such that the first communication interface is coupled to the second communication interface.

In some embodiments, a controller is provided in the gimbal, and the controller may be used to control the gimbal to enter different modes based on the connection status of the first electrical and/or communication interface in the gimbal. For example, when the first electrical interface is connected to the second electrical interface, the controller in the gimbal can control the gimbal to enter the charging mode. For example, the gimbal can supply power to the load through the first electrical interface and the second electrical interface. When the first electrical interface is disconnected from the second electrical interface, the controller can control the gimbal to exit the charging mode, and the gimbal can stop supplying power to the load.

In some embodiments, a controller is provided in the gimbal, and the controller may be used to monitor the power information of the load via the first electrical and/or communication interface and start power supply when the load power is lower than a certain threshold. In doing so, the gimbal can supply power to the load with low power and ensure the load to have sufficient battery power to be operable.

In some embodiments, a controller is provided in the gimbal, and the controller may be used to monitor the load change through the first electrical and/or communication interface, and adapt the control of the gimbal based on the load change. In this way, the control parameters of the gimbal can be adjusted according to the change of load. For example, different loads have identification codes, and the identification code of the load corresponds to the type of the load. When the first interface and the second interface are connected, the gimbal can obtain the identification code of the load. According to the identification code, the gimbal may adjust the control parameters of the gimbal. For example, the gimbal can pre-store the corresponding relationship between the identification code of the load and the control parameter. When the specific load identification code is obtained, the corresponding relationship between the identification code and the control parameter is matched to the control the gimbal. The control parameters of the gimbal may include the attitude angle of the motor, shooting parameters, display parameters, and so on.

In some embodiments, the first interface is provided in the control terminal that controls a movable object. The control terminal includes a controller, and the controller is used to control the movable object to enter different modes based on the connection state of the first interface, e.g. hover.

In some embodiments, the first interface is provided in the control terminal that controls a movable object. The control terminal includes a controller, and the controller is used to control the connection status of the first interface, the function of the remote control terminal, e.g., disable certain features.

In some embodiments, the first interface is provided in the control terminal that controls a movable object. The control terminal includes a controller, and the controller is used to monitor the power information of the load through the first interface, and when the power is below a certain level start power supply.

In some embodiments, the first interface is provided in a movable object. The movable object includes a controller, and the controller is used to control the movable object to enter different modes based on the connection state of the first interface, for example, hovering, returning home, landing, or control the movable object to adopt different obstacle avoidance modes.

In some embodiments, the first interface is provided in a movable object. The movable object includes a controller, and the controller is used to monitor the power information of the load through the first interface and start power supply when the power is lower than a certain threshold.

In some embodiments, the first interface is provided in a movable object to adapt to different loads. The movable object includes a controller, and the controller is used to monitor the change of the load through the first interface, and adaptively switch the control logic of the mobile platform through the load change, where the load changes include changes in load types, such as lidar, microphones, imaging devices, etc.

In some embodiments, the movable object can be an unmanned aerial vehicle (UAV), and the first interface can be set on the body of the UAV or on an arm of the UAV.

In some embodiments, the connector assembly 410 may further comprise a first mark configured to cooperate with a second mark on the mounting structure 420 to guide a connection between the connector assembly 410 and the mounting structure 420.

The connector assembly shown in FIG. 3A is illustrative, and a connector assembly may include more or less components than the connector assembly 410 shown in FIG. 3A without departing from the spirit of the present disclosure.

FIG. 3B is a schematic diagram showing a back view of an exemplary mounting structure 420, in accordance with embodiments of the present disclosure. The mounting structure 420 may be removably attached to a load, such as a mobile phone or a camera. As shown in FIG. 3B, the mounting structure 420 may include two single-sided unipolar magnets 421, a single-sided bipolar magnet 422, a positioning structure 423, and clamping portions 425. The layout of the magnets 421 and 422 reversely corresponds to the layout of the magnets 411 and 412 of the connector assembly 410, such that the magnets 421 and 422 attract to the magnets 411 and 412, respectively.

As shown in FIG. 3B, each of the single-sided unipolar magnets 421 includes a North pole and a South pole located at opposite ends of the single-sided unipolar magnet. When the back of the mounting structure 420 faces downward (e.g., by flipping over the mounting structure 420) and is placed near the front of the connector assembly 410, the North pole of one of the magnets 421 is attracted to the South pole of one of the magnets 411, and the South pole of the other one of the magnets 421 is attracted to the North pole of the other one of the magnets 411, thereby facilitating the coupling between the connector assembly 410 and mounting structure 420. The single-sided bipolar magnet 422 includes a South pole located at an inner ring of the single-sided bipolar magnet and North a pole located at an outer ring of the single-sided bipolar magnet. The inner ring and outer ring have the same size of area. When the back of the mounting structure 420 faces downward (e.g., by flipping over the mounting structure 420) and is placed near the front of the connector assembly 410, the South pole (inner ring) of the magnet 422 is attracted to the North pole (inner ring) of the magnet 412, and the North pole (outer ring) of the magnet 422 is attracted to the South pole (outer ring) of the magnet 412, thereby facilitating the coupling between the connector assembly 410 and mounting structure 420.

As shown in FIG. 3B, the magnetic poles in the first single-sided unipolar magnet have opposite directions to magnetic poles in a second single-sided unipolar magnet. As shown in FIG. 3B, centers of the single-sided bipolar magnet 422 and the two single-sided unipolar magnets 421 may be triangularly distributed. In some embodiments, the mounting structure 420 further comprises a magnetic yoke member magnetized by the single-sided unipolar magnet 421, the magnetic yoke member and the single-sided unipolar magnet 421 attract one or more attraction members on the connector assembly 410.

In some embodiments, the mounting structure 420 may include one or more single-sided unipolar magnets and not include any single-sided bipolar magnet. For example, the connector assembly 410 and mounting structure 420 may both include only single-sided unipolar magnets. In other embodiments, the connector assembly 410 and mounting structure 420 may both include one or more single-sided bipolar magnets and not include any single-sided unipolar magnet. In other embodiments, such as the embodiment shown in FIGS. 3A and 3B, the connector assembly 410 and mounting structure 420 may both include single-sided unipolar magnets and a single-sided bipolar magnet. When placed near, the South pole in the magnets of the connector assembly 410 attracts the North pole in the magnets of the mounting structure 420, and the North pole in the magnets of the connector assembly 410 attracts the South pole in the magnets of the mounting structure 420.

The positioning structure 423 is configured to fit with the corresponding positioning structure 413 on the connector assembly 410, such that the connector assembly 410 and mounting structure 420 are guided into a correct position to attach to each other. As discussed above, the positioning structure may include a concave structure configured to couple with a convex structure of the connector assembly 410. The positioning structure may also include an inclined surface configured to match an inclined surface on the connector assembly 410. The positioning structure may match a shape of the corresponding positioning structure on the connector assembly 410, and the shape of the positioning structure may be non-circular.

The clamping portions 425 are configured to hold a load, such as a mobile phone or a camera. The clamping portions 425 may include elastic members such that the clamping portions may be pulled outwards to place the load in the mounting structure and hold the load in place when the clamping portions are released. In some embodiments, the mounting structure may hold the load using other mechanisms, such as via glue, strap, or other fastening mechanism.

In some embodiments, the mounting structure 420 may include a first electrical interface configured to electrically connect to a second electrical interface in the connector assembly 410. In some embodiments, the first electrical interface may be located near the edge of the mounting structure 420 such that there is sufficient space left on the mounting structure for placement the attraction members (e.g., magnets). The first electrical interface may be detachable from the second electrical interface. The magnets 421 and 422 may be configured to cause at least one of the first electrical interface or second electrical interface to rotate in a direction such that the first electrical interface is coupled to the second electrical interface. A battery power of the electronic device or the handheld gimbal may be charged via the first and second electrical interfaces.

In some embodiments, the mounting structure 420 may include a first communication interface configured to communicate with a second communication interface in the connector assembly 410. The first communication interface may include a wired or wireless communication interface. In some embodiments, the first communication interface may be located near the edge of the mounting structure 420 such that there is sufficient space left on the mounting structure for placement the attraction members (e.g., magnets). The first communication interface may be detachable from the second communication interface. The first set of attraction members may be configured to cause at least one of the first communication interface or second communication interface to rotate in a direction such that the first communication interface is coupled to the second communication interface.

In some embodiments, the mounting structure 420 may include a second interface configured to electrically connect to and/or communicate with the load (e.g., an electronic device) attached to the mounting structure 420. The second interface may be located at a side different from the first electrical interface or the first communication interface, such as at the side opposite to where the attraction members are located. For example, the second interface may include a port and/or an extensible cord for electrical connection and/or communication with the load. As another example, the second interface may include a wireless interface for electrical connection and/or communication with the load.

FIG. 3C is a schematic diagram showing a top view of an exemplary mounting structure 420, in accordance with embodiments of the present disclosure. As shown in FIG. 3C, the clamping portions 425 can be used to hold the load. The magnets 421 and 422 are located on the underside of the mounting structure 420 for attaching to the magnets 411 and 412 on the connector assembly 410.

In some embodiments, the relative position between the connector assembly 410 and mounting structure 420 is detected in the process of attaching the mounting structure 420 to the connector assembly 410. Based on the relative position, the connector assembly 410 is driven to rotate so that the mounting structure 420 is attached to the connector assembly 410 at a preset position. For example, the relative position between the connector assembly 410 and mounting structure 420 may be detected by a sensor, such as an infrared ranging sensor, an ultrasonic ranging sensor, an alignment sensor. The mounting structure 420 may be attached to the connector assembly 410 at a preset position based on the relative position detected by the sensor.

In some embodiments, the mounting structure 420 may further comprise a first mark configured to cooperate with a second mark on the connector assembly 410 to guide a connection between the connector assembly 410 and the mounting structure 420.

The mounting structure shown in FIGS. 3A and 3B is illustrative, and a mounting structure may include more or less components than the mounting structure 420 shown in FIGS. 3A and 3B without departing from the spirit of the present disclosure.

Figure 4E:
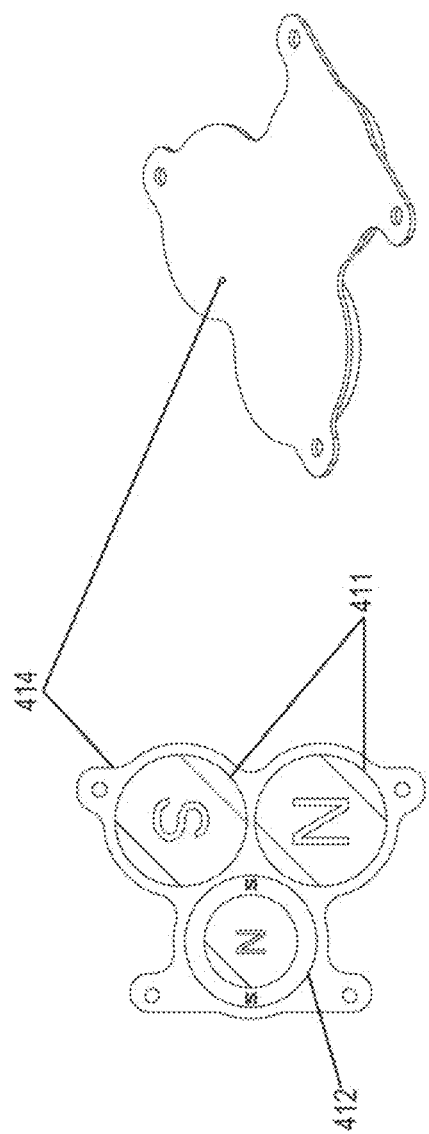

FIG. 4E is a schematic diagram showing the metal piece 414 in the connector assembly, in accordance with embodiments of the present disclosure. The metal piece may be placed directly or indirectly under the magnets 411 and 412 of the connector assembly. As shown in FIG. 4E, the metal piece can be a thin metal sheet. By adding the metal piece behind the magnet, the magnetic circuit leakage of magnets 411, 412, 421, and 422 can be reduced. As discussed above, the magnetic poles of magnets 411 and 421 are reversed, and the magnetic poles of magnets 412 and 422 are reversed. After the addition of the metal piece 414, the direct magnetic circuits between magnets 411 and 421, magnets 412 and 422 are closed, thereby further reducing the impact on the internal magnetic sensor of the handheld gimbal.

FIG. 5 is a schematic diagram showing an exemplary mounting structure 510 for a mobile phone 512, in accordance with embodiments of the present disclosure. As shown in FIG. 5, a side of the mounting structure 510 may be attached to the mobile phone 512 by glue. For example, the mounting structure 510 may include a sticker for sticking to the mobile phone 512. Similar to the mounting structure 420 discussed above in connection with FIGS. 3B-3C, the mounting structure 510 may include one or more attraction members (e.g., magnets) configured to attach to the magnets on the connector assembly. In some embodiments, the mounting structure 510 may also be attached to a case that houses the mobile phone 512. Thus, the mounting structure 510 may be permanently or semi-permanently attached to the mobile phone 512 or the mobile phone case. In some embodiments, the mounting structure 510 may further include a ring buckle that can be used to support the mobile phone 512 on a surface. The ring buckle can also be used to secure the mobile phone 512 by allowing a user to put one or more fingers across the ring buckle when holding the mobile phone 512, thereby preventing the mobile phone from being dropped by accident. The mounting structure 510 may also be used for other types of load, such as a tablet, a camera, or the like.

FIG. 6A is a schematic diagram showing an exemplary camera adapter 610, in accordance with embodiments of the present disclosure. As shown in FIG. 6A, the camera adapter 610 can be removably attached to a camera 600 (e.g., an action camera). The camera adapter 610 may include locking members 611, a magnetic portion 612, and a weight balancing structure 613. The locking members 611 may include a lock switch, a spring plunger, a magnetically attracted pin structure, or a threaded connection. The magnetic portion 612 includes one or more attraction members (e.g., magnets) configured to attach to the corresponding magnets in the connector assembly of the handheld gimbal. The magnets in the magnetic portion 612 may be configured similarly to the magnet layout discussed above in connection with the mounting structure 420. In some embodiments, the magnetic portion 612 may include a positioning structure to facilitate attachment to the handheld gimbal. The positioning structure in the magnetic portion 612 may be configured similarly to the positioning structure discussed above in connection with the mounting structure 420. The weight balancing structure 613 balances the weight of the camera 600 to ensure the camera to be horizontal on the handheld gimbal. The weight balancing structure 613 operates to avoid the camera capturing frame components of the gimbal into the pictures by increasing the counterweight to achieve leveling as the camera deviates from the roll motor. The weight balancing structure 613 may include one or more grooves 614 to help for finger placement and prevent finger slipping.

The camera adapter 610 shown in FIG. 6A is illustrative, and a camera adapter may include more or less components than the camera adapter 610 shown in FIG. 6A without departing from the spirit of the present disclosure. For example, the camera adapter may not have the weight balancing structure. As another example, the camera adapter may include additional components for securing the camera to the camera adapter.

FIG. 6B is a schematic diagram showing an exemplary handheld gimbal 620 for attaching to the camera adapter 610, in accordance with some embodiments of the present disclosure. The handheld gimbal 620 includes components similar to the handheld gimbal 100 described above in connection with FIG. 1A, and the description is not repeated herein for brevity of the present disclosure.

FIG. 6C is a schematic diagram showing an exemplary gimbal system 630, in accordance with embodiments of the present disclosure. As shown in FIG. 6C, the camera adapter 610 and handheld gimbal 620 are connected by magnetic attraction. The electric motor in the handheld gimbal 620 may drive the connector assembly in the handheld gimbal to rotate in a direction such that the connector assembly is attached to the magnetic portion of the camera adapter in a predetermined position. In some embodiments, the magnetic portion 612 in the camera adapter 610 may be fixedly attached to the camera 600.

Figure 7D:
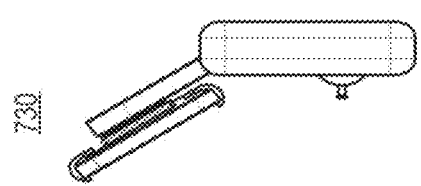
FIGS. 7A-7D are schematic diagrams showing an exemplary quick release assembly for a remote controller, in accordance with embodiments of the present disclosure.
Figure 7C:
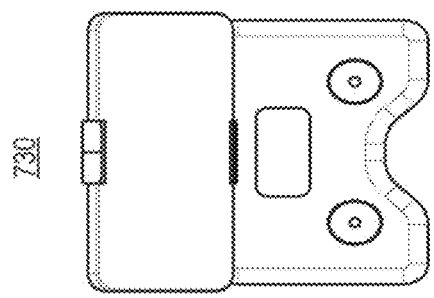
Figure 7B:
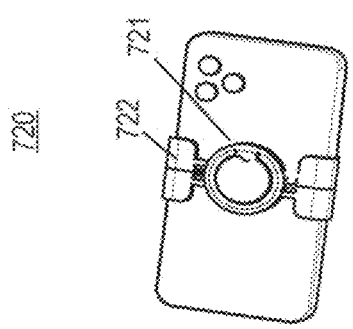
Figure 7A:
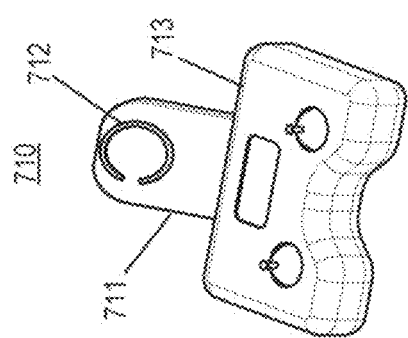

FIGS. 7A-7D are schematic diagrams showing an exemplary quick release assembly for a remote controller, in accordance with embodiments of the present disclosure. The quick release assembly allows an electronic device (e.g., a mobile phone) to detachably mount on a remote controller. FIG. 7A is a schematic diagram showing an exemplary remote controller 710, in accordance with embodiments of the present disclosure. The remote controller 710 may include a supporting structure 711, a connector assembly 712, and a controller body 713. The supporting structure 711 is used for attaching an electronic device to the remote controller. In some embodiments, the supporting structure 711 can be folded inside the controller body 713. The supporting structure 711 is coupled to the connector assembly 712. The connector assembly 712 includes one or more attraction members (e.g., magnets) for detachably mounting the electronic device on the supporting structure. The connector assembly 712 may include components similar to the connector assembly 410 discussed above in connection with FIG. 3A, and the description is not repeated herein for brevity of the present disclosure. The controller body 713 may include a display screen for displaying information of a movable object, such as an unmanned aerial vehicle (UAV), and/or one or more joysticks for controlling movement of the object. In some embodiments, the remote controller 710 may include an electric motor that causes the connector assembly 712 to rotate in a direction to attach to the mounting structure on the electronic device. In other embodiments, the remote controller 710 may not include an electric motor, and the attraction members may cause the mounting structure on the electronic device to rotate to attach to the connector assembly 712 at a preset position. The remote controller shown in FIG. 7A is illustrative, and a remote controller may include more or less components than the handheld gimbal 710 shown in FIG. 7A without departing from the spirit of the present disclosure.

FIG. 7B is a schematic diagram showing an exemplary mounting structure 720, in accordance with some embodiments of the present disclosure. The mounting structure 720 is removably attachable to an electronic device with a display screen, e.g., a mobile phone, and can be attached to the connector assembly 712 on the remote controller. The mounting structure 720 may include a magnet portion 721 and a clamping portion 722. The magnet portion 721 includes one or more magnets to attach to the corresponding magnets on the connector assembly 712. The mounting structure 720 may include components similar to the mounting structure 420 discussed above in connection with FIG. 3B, and the description is not repeated herein for brevity of the present disclosure.

FIG. 7C is a schematic diagram showing a top view of an exemplary remote controller system 730, in accordance with embodiments of the present disclosure. FIG. 7D is a schematic diagram showing a side view of the exemplary remote controller system 730, in accordance with embodiments of the present disclosure. As shown in FIGS. 7C and 7D, the mounting structure 720 and remote controller 710 are connected by magnetic attraction. When the remote controller 710 and the mounting structure 720 are near to each other, the magnetic attraction causes the mobile phone to be firmly installed on the remote control in a predetermined position. In some embodiments, the connector assembly on the remote controller has the same magnetic layout as the connector assembly on the handheld gimbal, such that the mounting structure 720 can be mounted on both the handheld gimbal and the remote controller. In doing so, the user experience is enhanced by the universality of the mounting structure between various devices.

Figure 8B:
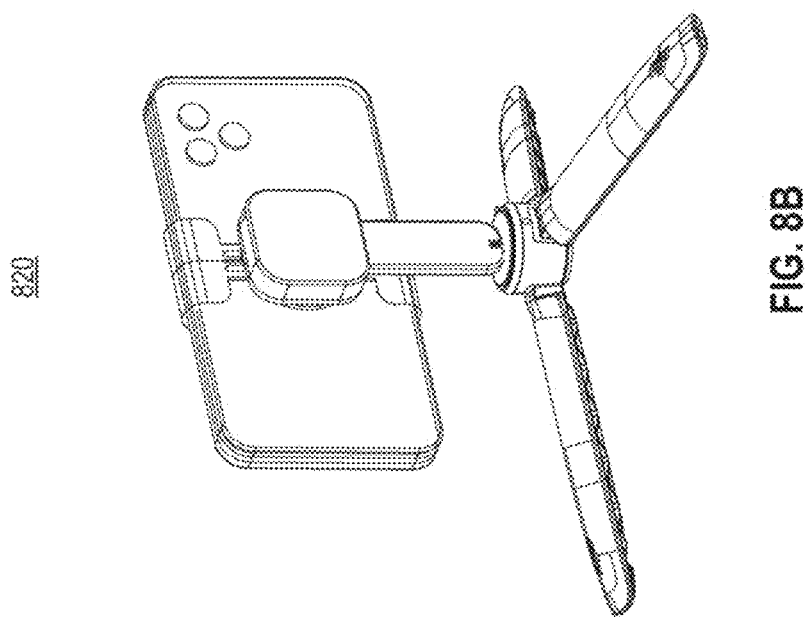
FIGS. 8A-8B are schematic diagrams showing an exemplary quick release assembly for a tripod head, in accordance with embodiments of the present disclosure.
Figure 8A:
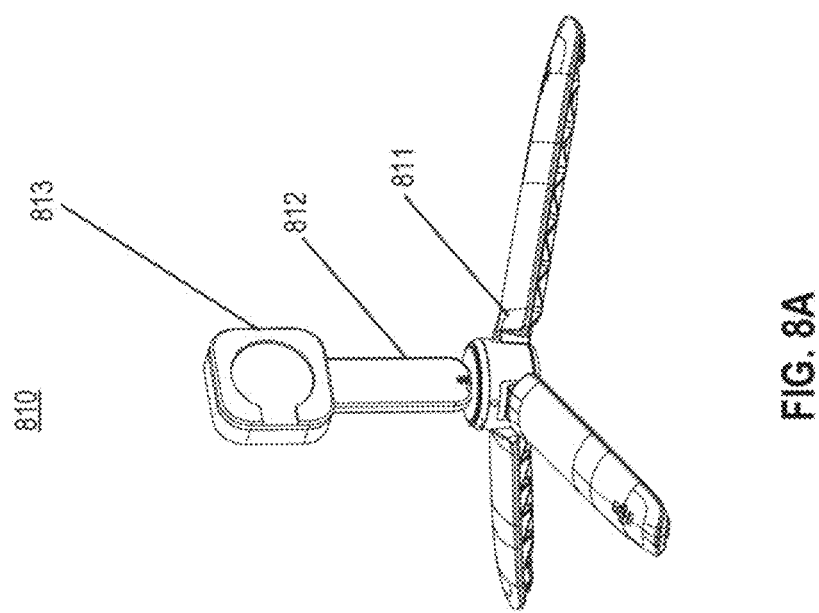

FIGS. 8A-8B are schematic diagrams showing an exemplary quick release assembly for a tripod head, in accordance with embodiments of the present disclosure. The quick release assembly allows an electronic device, e.g., a mobile phone, a camera, to detachably mount on a tripod head. FIG. 8A is a schematic diagram showing an exemplary tripod 810, in accordance with embodiments of the present disclosure. The tripod 810 may include a tripod member 811, a handle 812, and a connector assembly 813. The connector assembly 813 is used for attaching an electronic device to the tripod 810. The connector assembly 813 includes one or more magnets for detachably mounting the electronic device on the tripod. The connector assembly 813 may include components similar to the connector assembly 410 discussed above in connection with FIG. 3A, and the description is not repeated herein for brevity of the present disclosure. In some embodiments, the tripod 810 may include an electric motor that causes the connector assembly 813 provided on the tripod to rotate in a direction to attach to the mounting structure on the electronic device. In other embodiments, the tripod 810 may not include an electric motor, and the attraction members may cause the mounting structure on the electronic device to rotate to attach to the connector assembly 813 at a preset position. The tripod shown in FIG. 8A is illustrative, and a tripod may include more or less components than the tripod 810 shown in FIG. 8A without departing from the spirit of the present disclosure.

FIG. 8B is a schematic diagram showing an exemplary tripod system 820, in accordance with embodiments of the present disclosure. As shown in FIG. 8B, the mounting structure (e.g., the mounting structure 420 described above) attached to the mobile phone is connected to the connector assembly 813 on tripod 810 by magnetic attraction. When the connector assembly 813 and the mounting structure 420 are near to each other, the magnetic attraction causes the mobile phone to be firmly installed on the tripod in a predetermined position. In some embodiments, the connector assembly on the tripod has the same magnetic layout as the connector assembly on the handheld gimbal and/or the connector assembly on the remote controller, such that the mounting structure 420 can be mounted on various devices, such as the handheld gimbal, remote controller and tripod. In doing so, the user experience is enhanced by the universality of the mounting structure between various devices.

Figure 9A:
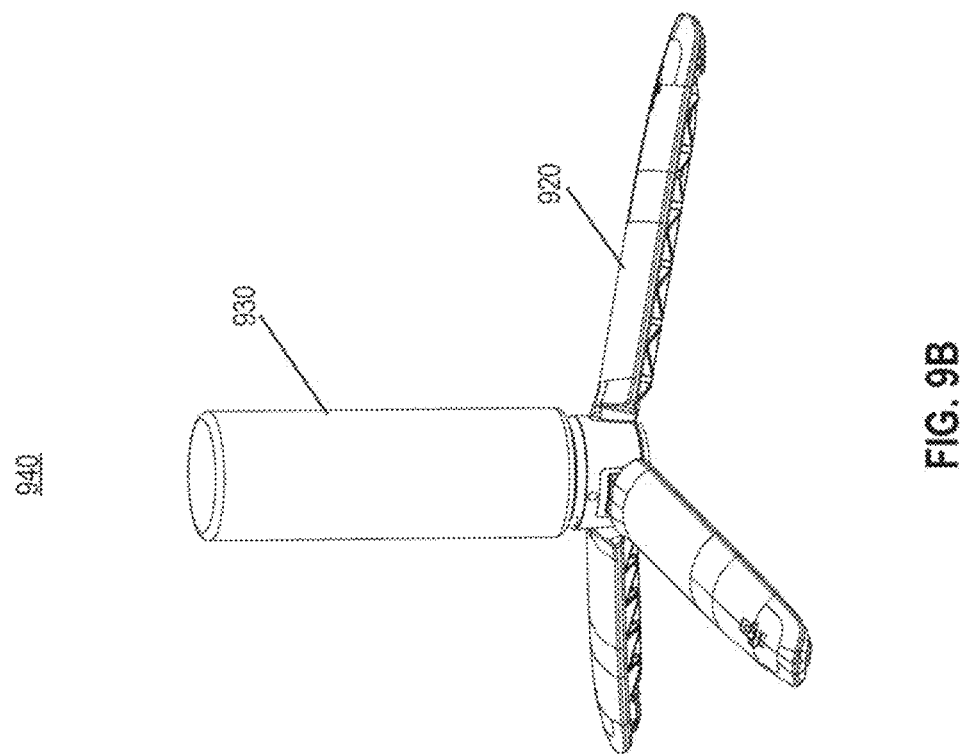
FIGS. 9A-9B are schematic diagrams showing an exemplary quick release assembly for a tripod handle, in accordance with embodiments of the present disclosure.
Figure 9B:
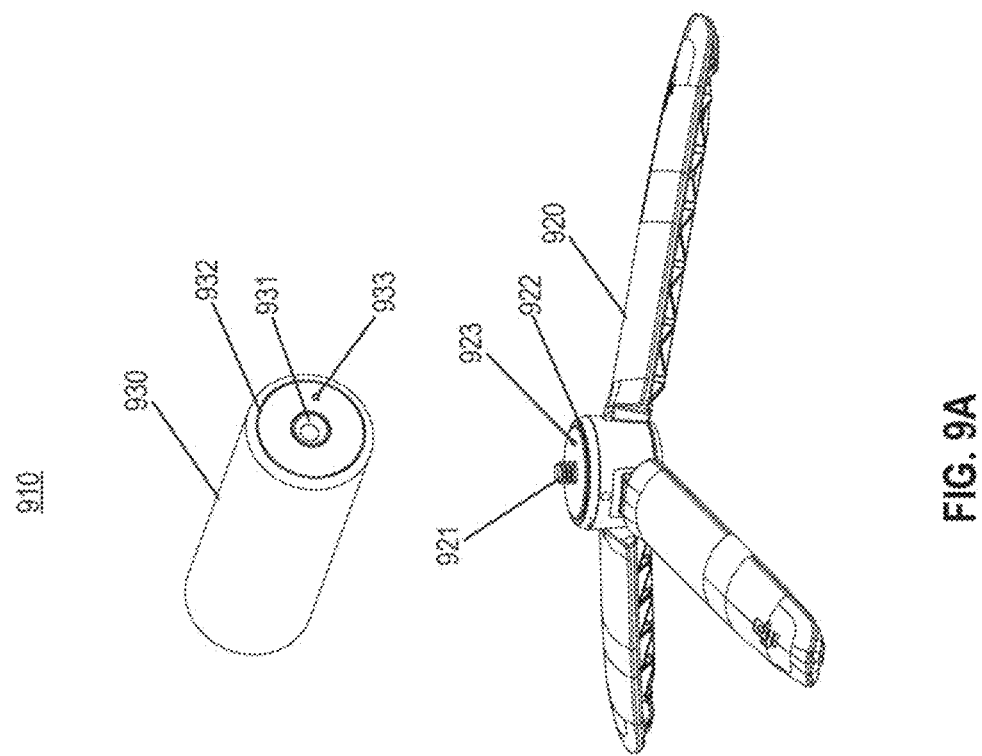

FIGS. 9A-9B are schematic diagrams showing an exemplary quick release assembly for a tripod handle, in accordance with embodiments of the present disclosure. The quick release assembly allows a tripod handle to detachably mount on a tripod member. FIG. 9A is a schematic diagram showing an exemplary tripod 910, in accordance with embodiments of the present disclosure. The tripod 910 may include a tripod member 920 and a handle 930. The tripod member includes a connector assembly to detachably connect with the mounting structure on the handle. In other embodiments, the connector assembly may be located on the handle 930 to detachably connect with the mounting structure on the tripod member 920, where the connector assembly may be driven to rotate by the yaw motor of the handheld gimbal that is operably connected to the connector assembly. The connector assembly may include a thread structure 921, a magnetic portion 922, and a positioning structure 923. The mounting structure may also include a thread structure 931 corresponding to the thread structure 921, a magnetic portion 932, and a positioning structure 933. The magnetic portion 922 includes one or more attraction members (e.g., magnets) to attract to the attraction members (e.g., magnets) in the magnetic portion 932. The thread structure 931 may be screwed onto the thread structure 921 to facilitate the coupling between the connector assembly and the mounting structure. The positioning structure 923 includes a protrusion to fit with a groove in the positioning structure 933. In some embodiments, because of the attraction force between the magnetic portion 922 and the magnetic portion 932, the thread structure 921 and 931 may be omitted, thereby making the installation of the handle more convenient. The magnetic portion 922 may have a magnetic layout similar to that of the connector assembly 410 discussed above in connection with FIG. 3A, and the description is not repeated herein for brevity of the present disclosure. In some embodiments, the tripod 910 may include an electric motor that causes the connector assembly to rotate in a direction to attach to the mounting structure on the tripod handle. In other embodiments, the tripod 910 may not include an electric motor, and the attraction members may cause the mounting structure on the tripod handle to rotate to attach to the connector assembly at a preset position. The magnetic portion 932 may have a magnetic layout similar to that of the mounting structure 420 discussed above in connection with FIG. 3B, and the description is not repeated herein for brevity of the present disclosure. The tripod shown in FIG. 9A is illustrative, and a tripod may include more or less components than the tripod 910 shown in FIG. 9A without departing from the spirit of the present disclosure. For example, in some embodiments, the connector assembly and mounting structure may not include a thread structure.

FIG. 9B is a schematic diagram showing an exemplary tripod assembly 940, in accordance with embodiments of the present disclosure. As shown in FIG. 9B, the mounting structure (e.g., the mounting structure 420 described above) on the handle is connected to the connector assembly on tripod member by magnetic attraction. The magnetic portion 932 at the end of the handle allows the handle to be quickly positioned on the magnetic portion 922 of the tripod member. When the connector assembly and the mounting structure are near to each other, the magnetic attraction facilitates the handle to be firmly installed on the tripod member.

FIGS. 10A-10D are schematic diagrams showing an exemplary quick release assembly for an extension rod, in accordance with embodiments of the present disclosure. FIG. 10A is a schematic diagram showing an exemplary extension rod 1010, in accordance with embodiments of the present disclosure. The extension rod 1010 may include a connector assembly 1011 and a pole 1012. The connector assembly 1011 includes one or more attraction members (e.g., magnets) for detachably mounting an electronic device on the extension rod. In some embodiments, the extension rod 1010 may include an electric motor that causes the connector assembly to rotate in a direction to attach to the mounting structure on the electronic device. In other embodiments, the extension rod 1010 may not include an electric motor, and the attraction members may cause the mounting structure on the electronic device to rotate to attach to the connector assembly at a preset position. The connector assembly 1011 may include components similar to the connector assembly 410 discussed above in connection with FIG. 3A, and the description is not repeated herein for brevity of the present disclosure. In some embodiments, the connector assembly 1011 may include mechanical locks to facilitate connection between the extension rod and the mounting structure on the electronic device. The extension rod shown in FIG. 10A is illustrative, and an extension rod may include more or less components than the extension rod 1010 shown in FIG. 10A without departing from the spirit of the present disclosure.

FIG. 10B is a schematic diagram showing an exemplary mounting structure 1020, in accordance with some embodiments of the present disclosure. The mounting structure 1020 is removably attachable to the electronic device and can be attached to the connector assembly 1011 on the extension rod. The mounting structure 1020 may include a magnet portion 1021 and a clamping portion 1022. The magnet portion 1021 includes one or more magnets to attach to the corresponding magnets on the connector assembly 1011. The mounting structure 1020 may include components similar to the mounting structure 420 discussed above in connection with FIG. 3B, and the description is not repeated herein for brevity of the present disclosure.

FIG. 10C is a schematic diagram showing a front view of an exemplary extension rod system 1030, in accordance with embodiments of the present disclosure. FIG. 10D is a schematic diagram showing a back view of the exemplary remote controller system 1030, in accordance with embodiments of the present disclosure. As shown in FIGS. 10C and 10D, the mounting structure 1020 and extension rod 1010 are connected by magnetic attraction. When the connector assembly 1011 and the mounting structure 1020 are near to each other, the magnetic attraction causes the mobile phone to be firmly installed on the extension rod. In some embodiments, the connector assembly on the extension rod has the same magnetic layout as the connector assembly on the handheld gimbal and/or the connector assembly on the remote controller, such that the mounting structure 1020 can be mounted on various devices, such as the handheld gimbal, remote controller, tripod, and extension rod. In doing so, the user experience is enhanced by the universality of the mounting structure between various devices. In some embodiments, the extension rod 1010 may operate similarly to the handle 930 shown in FIG. 9A, and the extension rod 1010 may include a mounting structure to attach to the connector assembly on the tripod member 920 shown in FIG. 9A. In some embodiments, an end of the extension rod 1010 may include a tripod member.

In the embodiments described above, the quick release assembly allows the connector assembly and mounting structure to be connected at a preset position based on the rotation of the rotating mechanism, whatever the relation position between the connector assembly and the mounting structure. The connector assembly and mounting structure may be automatically connected or disconnected with minimal user intervention based on the rotation of the rotating mechanism, and the unique connection position between the connector assembly and mounting structure may be ensured by the quick release assembly. When the connector assembly and the mounting structure are required to have the uniqueness of the connection position, the position of the mounting structure can be adjusted by the rotating mechanism. In some circumstances, such as the connection between the tripod and handheld gimbal, the quick release assembly also ensures the balance of the center of gravity of the handheld gimbal to fall on the center of the tripod, thereby stabilizing the support from the tripod.

It is to be understood that the disclosed embodiments are not necessarily limited in their application to the details of construction and the arrangement of the components set forth in the following description and/or illustrated in the drawings and/or the examples. The disclosed embodiments are capable of variations, or of being practiced or carried out in various ways. The types of user control as discussed in the present disclosure can be equally applied to other types of movable objects or any suitable object, device, mechanism, system, or machine configured to travel on or within a suitable medium, such as a surface, air, water, rails, space, underground, etc. It will be apparent to those skilled in the art that various modifications and variations can be made to the disclosed devices and systems. Other embodiments will be apparent to those skilled in the art from consideration of the specification and practice of the disclosed devices and systems. It is intended that the specification and examples be considered as exemplary only, with a true scope being indicated by the following claims and their equivalents.

What is claimed is:

1. A handheld gimbal, comprising:
   a handheld structure;
   a gimbal body operably coupled with the handheld structure; and
   a connector assembly operably coupled with the gimbal body, wherein the connector assembly comprises one or more attraction structures for detachably mounting an electronic structure on the gimbal body, the one or more attraction structures are configured to cause at least one of the connector assembly or a mounting structure attached to the electronic structure to rotate in a direction such that the connector assembly is coupled to the mounting structure, and the one or more attraction structures comprise at least one single-sided unipolar magnet and at least one single-sided bipolar magnet.

2. The handheld gimbal of claim 1, wherein the gimbal body comprises one or more electric motors, the connector assembly is operably coupled with one of the one or more electric motors, and the one of the one or more electric motors is configured to drive the connector assembly to rotate around a preset axis.

3. The handheld gimbal of claim 1, wherein:
   the connector assembly further comprises a magnetic yoke structure magnetized by the at least one single-sided unipolar magnet, the magnetic yoke structure and the at least one single-sided unipolar magnet attract the one or more attraction structures on the mounting structure; or
   the one or more attraction structures comprise at least two single-sided unipolar magnets; or
   the at least one single-sided bipolar magnet includes a south pole and a north pole on a side of the single-sided bipolar magnet, the south pole and north pole are located at opposite ends of the side.

4. The handheld gimbal of claim 1, wherein the at least one single-sided bipolar magnet comprises a south pole and a north pole, the north pole is located at a first portion of the at least one single-sided bipolar magnet, and the south pole is located at a second portion of the at least one single-sided bipolar magnet.

5. The handheld gimbal of claim 4, wherein:
   the first portion includes a first ring, and the second portion includes a second ring; and
   the first ring is an inner ring and the second ring is an outer ring, or the first ring is an outer ring and the second ring is an inner ring.

6. The handheld gimbal of claim 5, wherein a size of the first portion is identical to a size of the second portion.

7. The handheld gimbal of claim 1, wherein the one or more attraction structures comprise two single-sided unipolar magnets and one single-sided bipolar magnet.

8. The handheld gimbal of claim 7, wherein magnetic poles in a first single-sided unipolar magnets have opposite directions to magnetic poles in a second single-sided unipolar magnets.

9. The handheld gimbal of claim 8, wherein centers of the single-sided bipolar magnet and the two single-sided unipolar magnets are triangularly distributed.

10. The handheld gimbal of claim 7, wherein centers of the single-sided bipolar magnet and the two single-sided unipolar magnets are triangularly distributed.

11. The handheld gimbal of claim 1, wherein the connector assembly further comprises a metal structure coupled to the one or more attraction structure.

12. The handheld gimbal of claim 1, wherein the connector assembly further comprises a friction member to contact a portion of the mounting structure when the connector assembly is coupled to the mounting structure, and the friction member is attached to the one or more attraction structures.

13. The handheld gimbal of claim 1, wherein the connector assembly further comprises a first positioning structure to fit with a second positioning structure on the mounting structure attached to the electronic structure.

14. The handheld gimbal of claim 13, wherein:
the first positioning structure comprises a first inclined surface to match a second inclined surface of the second positioning structure; or
the first positioning structure comprises a convex structure to couple with a concave structure of the second positioning structure; or
a shape of the first positioning structure matches a shape of the second positioning structure, and the shape of the first positioning structure is non-circular.

15. The handheld gimbal of claim 1, wherein the connector assembly further comprises a first electrical interface to electrically connect to a second electrical interface in the mounting structure, and the one or more attraction structures cause at least one of the first electrical interface or second electrical interface to rotate in a direction such that the first electrical interface is coupled to the second electrical interface.

16. The handheld gimbal of claim 1, wherein the connector assembly further comprises a first communication interface to communicate with a second communication interface in the mounting structure, and the one or more attraction structures cause at least one of the first communication interface or second communication interface to rotate in a direction such that the first communication interface is coupled to the second communication interface.

17. The handheld gimbal of claim 1, wherein the gimbal body is rotatable relative to the handheld structure to cause the handheld gimbal to switch between a folded state and a use state, the connector assembly is operably coupled with an electric motor, the electric motor is configured to drive the connector assembly to rotate, and when the handheld gimbal is in the folded state, the one or more attraction structures are located between the electric motor and the handheld structure.

18. The handheld gimbal of claim 1, wherein the handheld gimbal further comprises the mounting structure, and the mounting structure includes one or more attraction structures for detachably mounting the electronic structure on the handheld gimbal.

19. The handheld gimbal of claim 1, wherein the connector assembly further comprises an electrical interface configured to electrically connected with the electronic structure and the gimbal body.

20. The handheld gimbal of claim 19, wherein the connector assembly is configured to rotate relative to the gimbal body to cause the electrical interface to be connected with the electronic structure and the gimbal body.

* * * * *